Patented Apr. 21, 1942

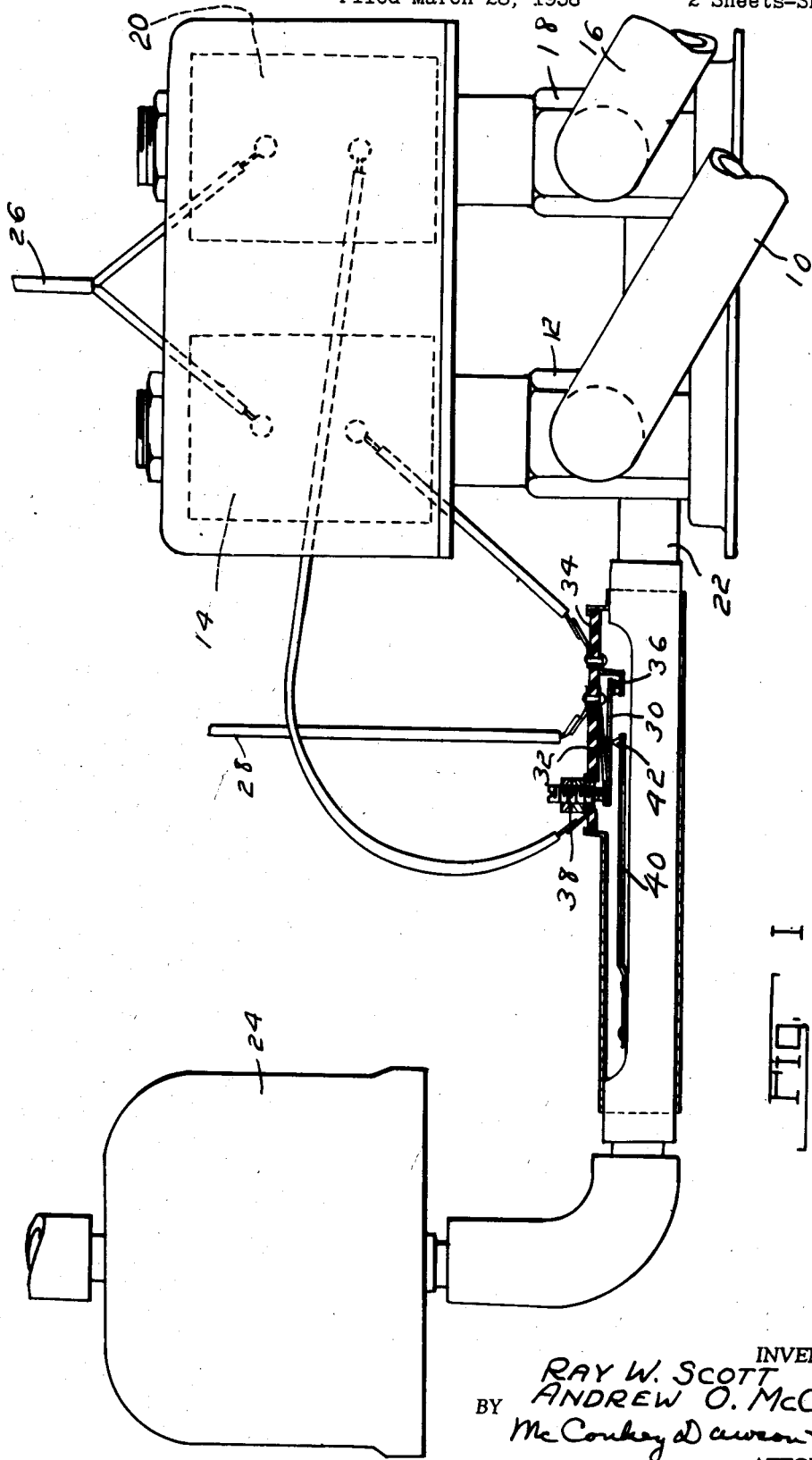

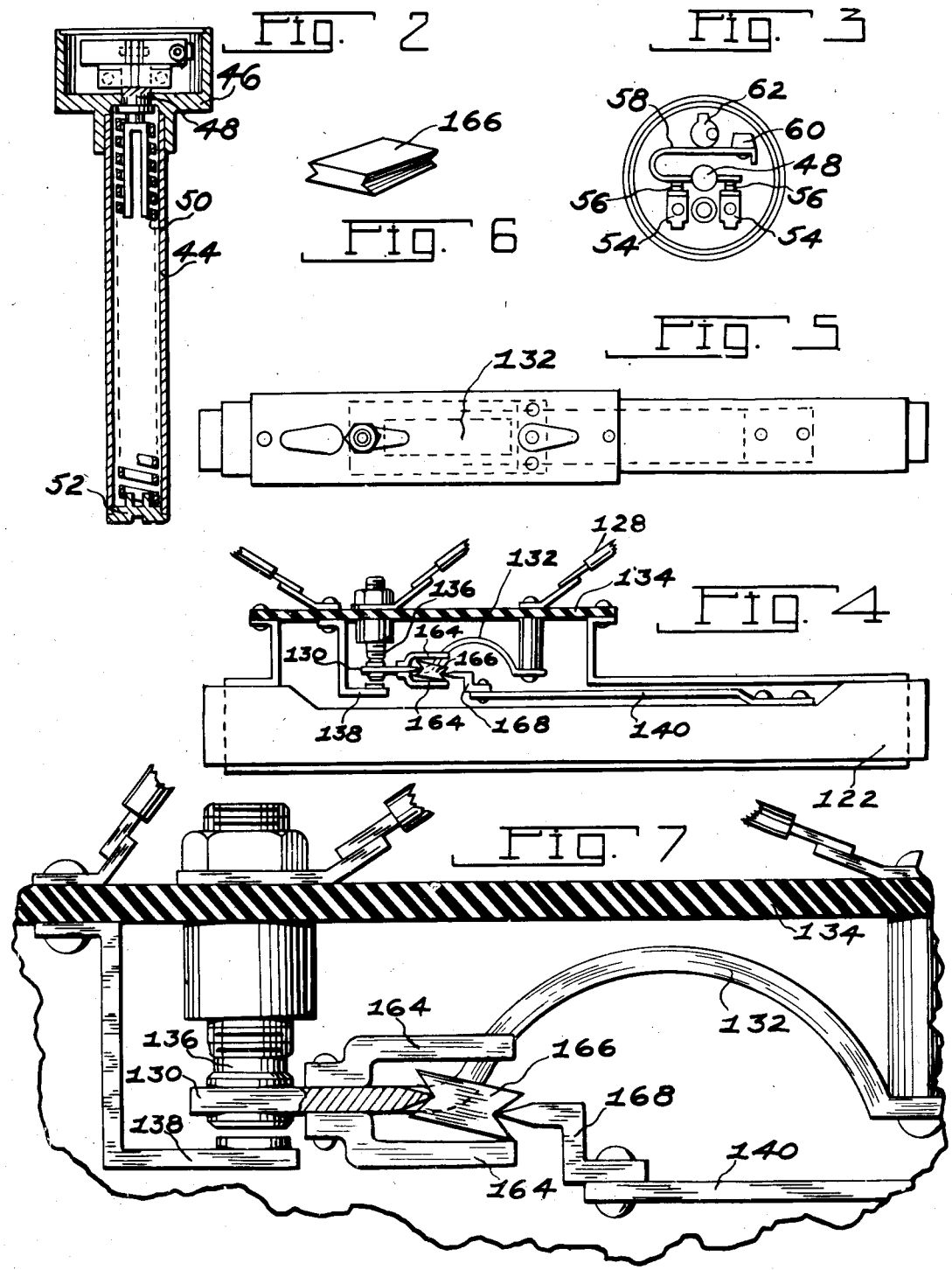

2,280,667

UNITED STATES PATENT OFFICE 2,280,667

MIXING DEVICE

Ray W. Scott and Andrew O. McCollum, Detroit, Mich., assignors to Bendix Home Appliances, Inc., South Bend, Ind., a corporation of Delaware Application March 28, 1938, Serial No. 198,431

2 Claims. (Cl. 200—138)

This invention relates to switches and more particularly to switches suitable for use in devices for automatically controlling the temperature of a mixture of hot and cold liquids.

One of the objects of the invention is to provide a novel snap-acting double contact switch suitable for use in a temperature controlled water mixing device.

Still another object of the invention is to provide a mixing device in which the valves are alternately opened and closed under the control of novel snap-acting mechanism.

Other objects, advantages and novel features of the invention including novel subcombinations and desirable features will be apparent from the following description of the illustrative embodiments shown in the accompanying drawings, in which:

Figure 1 is a diagrammatic view with parts in section of a mixing device embodying the invention;

Figure 2 is a center section of a modified form of temperature responsive control;

Figure 3 is a top view of the device of Figure 2;

Figure 4 is a section of another temperature responsive control with parts in elevation;

Figure 5 is a plan view of the mechanism of Figure 4;

Figure 6 is a perspective of a detail; and

Figure 7 is an enlarged fragmentary vertical view of the block and spring mechanism of Figure 4.

The invention is illustrated as an automatic mixing device for hot and cold water particularly adapted for use in connection with an automatic washing machine of the type described and claimed in the United States Patent of Rex Earl Bassett, Jr. and John W. Chamberlin No. 2,165,884, dated July 11, 1939. As shown in Figure 1 hot water is supplied through a pipe 10 under the control of a valve 12 which is normally closed and is opened by a solenoid 14. Cold water is supplied through a pipe 16 under the control of a normally closed valve 18 which is adapted to be opened by a solenoid 20. The hot and cold water flow into a common outlet pipe 22 which leads to a mixing chamber 24 from which the mixed hot and cold water is conducted to the washing machine. It will be understood that suitable shut off valves are incorporated in the pipes 10 and 16 to shut off the supply of water entirely as disclosed in said Patent No. 2,165,884.

The solenoids 14 and 20 are connected to one wire 26 of a suitable electric circuit and the other wire 28 thereof is connected to a contactor bar 30 through a leaf spring 32 which is secured to an insulating plate 34. The contactor bar 30 has a downwardly facing contact at one end and an upwardly facing contact at its other end adapted to engage fixed contacts 36 and 38 respectively which are connected to the solenoids 14 and 20. When both contacts are closed as shown in Figure 1, both solenoids will be energized to open valves 12 and 18 so that a substantially 50—50 mixture of hot and cold water will be discharged through the outlet pipe.

According to the present invention the solenoids are automatically controlled in accordance with the temperature of the mixture and for this purpose a bi-metal strip 40 is secured at one end to the outlet pipe and lies adjacent and substantially parallel thereto so as to be responsive to the temperature thereof. At its free end the strip 40 carries a knife edge 42 engaging the contactor bar 30 substantially at its center.

In the normal setting of the device the spring 32 presses down on the left end of the bar 30 and tends to hold it in engagement with the contact 36 and out of engagement with the contact 38. The bi-metal strip 40 opposes the spring 32 and when the temperature of the outlet pipe is at the desired value, the force asserted by the strip 40 will be just sufficient to raise the bar 30 into engagement with the contact 38 without disengaging it from the contact 36. If the temperature of the mixed water in the outlet pipe should become too high, the strip 40 will deflect upwardly to raise the right end of the bar 30 out of engagement with the contact 36 thereby de-energizing the solenoid 14 and closing valve 12 to shut off the hot water. At this time only cold water is flowing through the outlet pipe to cool the mixture in the chamber 24 and as soon as the thermostat 40 has become cooled down in response to the cold water contact 38 will again be closed to open the hot water valve. Similarly if the temperature of the mixture should become too cold, the strip 40 will deflect downwardly permitting the spring 32 to move the bar 30 out of engagement with the contact 38 to close the cold water valve. Thus the valves are controlled to produce a mixture at the temperature for which the thermostat 40 is set.

Figures 2 and 3 illustrate a modified thermostat control including a closed tube 44 adapted to be connected to or inserted in the outlet pipe at any desired point and having a cup-shaped head 46 secured to one end thereof. A shaft 48 is rotatably mounted in the head and extends into the tube where it is secured to one end of a helical bi-metal strip 50. The strip 50 is anchored at one end to a cap 52 on the tube so that it will rotate the shaft 48 in response to temperature changes.

A pair of fixed contacts 54 are secured in a head 46 and connected respectively to the solenoids 14 and 20. Cooperating contacts 56 are carried by one leg of a U-shaped spring 58, the opposite leg of which is secured at its free end to a fixed tap 60 which is connected to one side of the electric circuit. Between the contacts 56 the spring 58 is received in a slot in the shaft 48 so that as the shaft turns, the spring will be distorted to move the contacts 56. An eccentric 62 is preferably provided engaging the spring to adjust the tension thereof.

In operation of this embodiment when the temperature is at the desired value, the parts will occupy the position shown in Figure 3. Upon a variation in temperature, the shaft 48 will be turned to distort the spring 58, thereby moving one of the contacts 56 out of engagement with its corresponding contact 54. This interrupts the circuit to one or the other of the solenoids, thereby closing either the cold or the hot water valve in the manner described in connection with Figure 1.

The embodiment of Figures 4 to 6 is quite similar to that of Figure 1 and for the sake of brevity of description, parts therein corresponding to like parts in Figure 1 have been designated by the same reference numerals plus 100. In this embodiment the contacts 136 and 138 are arranged facing each other in spaced relationship and the movable contactor 130 lies between them. As shown, the contactor 130 is supported at one end of a leaf spring 132, the other end of which is fixedly secured to the plate 134. A pair of spaced arms 164 are secured to the contactor 130 to form a yoke lying on opposite sides thereof and the spring 132 has a cut out portion at its center between the arms 164. A block 166 having its opposite edges grooved as best seen in Figure 6 is mounted in the cut out portion of the spring 132 with one of its grooved edges pivotally engaging the spring 132 and its other cut out edge engaging an extension 168 on the bi-metal strip 140. The spring 132 is so constructed as to exert a compressive force on the block 166 between its points of engagement with the spring and with the extension 168.

In this embodiment one of the valves is always closed and the other is always open so that either hot or cold water is flowing but never both. In the position shown in Figure 4 the strip 140 is moved downwardly in response to a low temperature so that the block 166 has tilted upwardly to the left and moved the contactor 130 into engagement with the contact 136. This energizes the solenoid 14 and admits hot water to the outlet pipe. As the strip 140 rises in response to an increase in temperature, the block 166 will be tilted about its point of engagement with the spring 132 until it passses the dead center position at which time it will snap the contactor 130 downwardly out of engagement with the contact 136 and into engagement with contactor 138. This action occurs so rapidly that the hot water valve is closed and the cold water valve is opened substantially simultaneously. Cold water will then flow until the parts have cooled down sufficiently to cause reversal of the above described operation and this action will continue alternately opening and closing the valves. Since the time required to cool or warm the parts sufficiently to cause a reversal of the valves will depend upon the temperature of the water flowing, it will be apparent that a mixture of hot and cold water at the desired temperature will be obtained in the mixing chamber 24.

While the invention has been particularly described in connection with a water mixing device for use in automatic washing machines, it will be apparent that it might be utilized for any other purpose and that structural changes might be made therein. It is accordingly not intended to limit the scope of the invention to the forms shown nor otherwise than by the terms of the appended claims.

What is claimed is:

1. A thermostatic switch comprising spaced contacts, a movable contactor engageable with either of said contacts, said movable contactor including a pair of spaced legs forming a yoke, a bimetal strip secured at one end to an element, the temperature of which is to be controlled, and a block lying within and held in place by said yoke and pivotally engaging the contactor and the other end of the bimetal strip and forming a snap-acting connection therebetween.

2. A thermostatic switch comprising spaced contacts, a movable contactor engageable with either of said contacts, said movable contactor including a pair of spaced legs forming a yoke, a leaf spring carrying said contactor at one end and fixedly secured at the other, a bimetal strip secured at one end to an element the temperature of which is to be controlled, and a block pivotally engaging the contactor and the other end of the bimetal strip and forming a snap-acting connection therebetween, said block being held in place by the tension of the leaf spring.

RAY W. SCOTT.
ANDREW O. McCOLLUM.